(12) United States Patent
Helisch et al.

(10) Patent No.: US 11,585,233 B2
(45) Date of Patent: Feb. 21, 2023

(54) TURBOCHARGER HAVING AN ACTUATOR-ACTUATED ADJUSTING DEVICE AND A TRANSMISSION ELEMENT WITH ONE-PART COMPONENT BODY

(71) Applicant: VITESCO TECHNOLOGIES GMBH, Hannover (DE)

(72) Inventors: Daniel Helisch, Munich (DE); Christian Kirschner, Munich (DE); Nicolas Zieboll, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/283,139

(22) PCT Filed: Aug. 30, 2019

(86) PCT No.: PCT/EP2019/073267
§ 371 (c)(1),
(2) Date: Apr. 6, 2021

(87) PCT Pub. No.: WO2020/074182
PCT Pub. Date: Apr. 16, 2020

(65) Prior Publication Data
US 2021/0388734 A1    Dec. 16, 2021

(30) Foreign Application Priority Data
Oct. 9, 2018  (DE) .......................... 102018217240.4

(51) Int. Cl.
*F01D 17/10* (2006.01)
*F16C 11/06* (2006.01)

(52) U.S. Cl.
CPC ........ *F01D 17/105* (2013.01); *F16C 11/0623* (2013.01); *F16C 11/0685* (2013.01);
(Continued)

(58) Field of Classification Search
CPC ................ F01D 17/105; F16C 11/0623; F16C 11/0685; F16C 2220/42; F16C 2220/84;
(Continued)

(56) References Cited

U.S. PATENT DOCUMENTS 1,898,100 A     2/1933  Skillman
1,918,395 A *   7/1933  Hufferd ............... F16C 11/0628
                                                      403/136
(Continued)

FOREIGN PATENT DOCUMENTS

CN      103133127 A    6/2013
CN      104220770 A    12/2014
(Continued)

*Primary Examiner* — Audrey B. Walter
*Assistant Examiner* — Edward Bushard
(74) *Attorney, Agent, or Firm* — Laurence A. Greenberg; Werner H. Stemer; Ralph E. Locher

(57) ABSTRACT

A turbocharger for a combustion engine has an adjusting device for matching its operating behavior to the operating behavior of the combustion engine, an actuating actuator, and a transmission element. The transmission element is coupled between the actuating actuator and the adjusting device. The transmission element has a one-part component body, which in each case extends from a first coupling point to a second coupling point along a longitudinal axis and, in each of its end regions, has a coupling element for coupling to the actuating actuator and to the adjusting device. The respective coupling element is designed as an integral part of the component body in the form of a ball receptacle of a ball joint connection in the component body.

5 Claims, 5 Drawing Sheets

(52) U.S. Cl.
CPC ...... *F05D 2220/40* (2013.01); *F05D 2260/50* (2013.01); *F16C 2220/42* (2013.01); *F16C 2220/84* (2013.01); *F16C 2360/24* (2013.01)

(58) Field of Classification Search
CPC .. F16C 2360/24; F16C 11/0652; F16C 7/023; F05D 2220/40; F05D 2260/50; F02B 37/24; F02B 37/186; Y02T 10/12
See application file for complete search history.

(56) References Cited

U.S. PATENT DOCUMENTS

| | | | |
|---|---|---|---|
| 4,118,131 | A | 10/1978 | Schnitzius |
| 6,895,947 | B2 | 5/2005 | Allmang et al. |
| 9,297,297 | B2 | 3/2016 | Chu |
| 9,353,676 | B2 | 5/2016 | Reinisch |
| 9,771,943 | B2 | 9/2017 | Burkhard et al. |
| 10,302,123 | B2 | 5/2019 | Heidingsfelder et al. |
| 10,520,107 | B2 | 12/2019 | Malik |
| 10,808,605 | B2 | 10/2020 | Paulov |
| 2004/0055297 | A1 | 3/2004 | Allmang et al. |
| 2013/0139502 | A1 | 6/2013 | Chu |
| 2013/0163905 | A1 | 6/2013 | Vintinner et al. |
| 2015/0086266 | A1 | 3/2015 | Burkhard et al. |
| 2015/0098750 | A1* | 4/2015 | King ............... F02B 39/16 403/66 |
| 2015/0107404 | A1* | 4/2015 | Heidingsfelder ....... F01D 17/16 74/586 |
| 2015/0167542 | A1 | 6/2015 | Reinisch |
| 2018/0094573 | A1 | 4/2018 | Schoenherr et al. |
| 2018/0223727 | A1* | 8/2018 | Nakajima ........... F02B 37/186 |
| 2018/0230899 | A1* | 8/2018 | Paulov .............. F02B 37/186 |
| 2018/0334953 | A1* | 11/2018 | Colley .............. F02B 37/186 |

FOREIGN PATENT DOCUMENTS

| | | |
|---|---|---|
| CN | 104271920 A | 1/2015 |
| CN | 107366775 A | 11/2017 |
| DE | 102012211444 A1 | 1/2014 |
| DE | 102012223469 A1 | 6/2014 |
| DE | 102015108284 A1 | 12/2016 |
| DE | 102015219899 A1 | 4/2017 |
| EP | 1400658 A1 | 3/2004 |
| EP | 2867489 A1 | 5/2015 |
| GB | 1535955 A | 12/1978 |
| WO | 2013163030 A1 | 10/2013 |
| WO | 2013173057 A1 | 11/2013 |
| WO | 2014005941 A1 | 1/2014 |
| WO | 2014095150 A1 | 6/2014 |

* cited by examiner

FIG 4
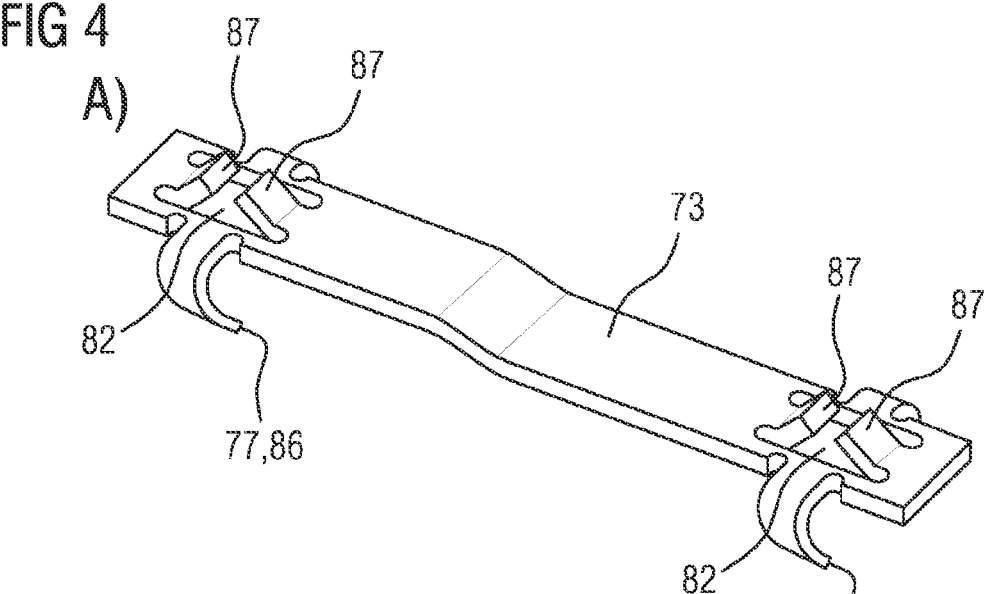
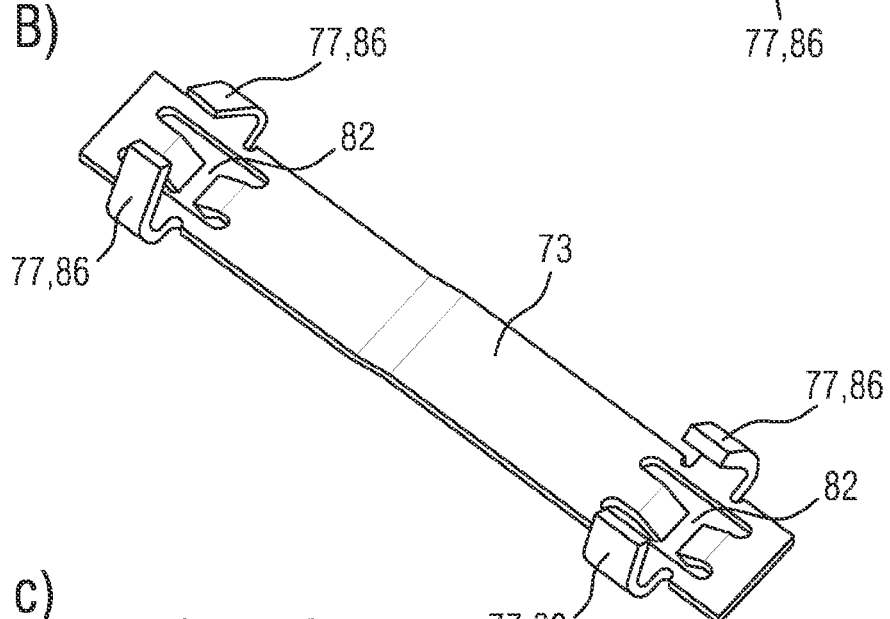
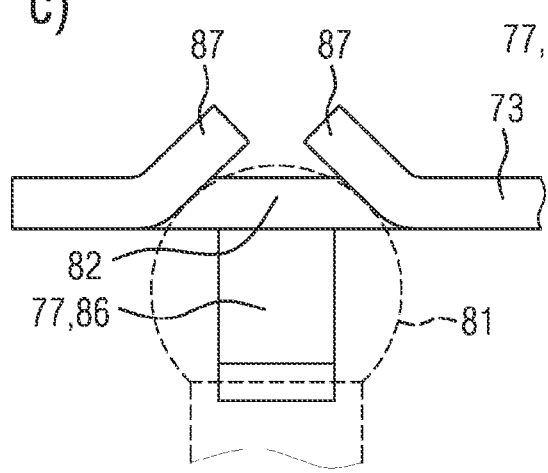

TURBOCHARGER HAVING AN ACTUATOR-ACTUATED ADJUSTING DEVICE AND A TRANSMISSION ELEMENT WITH ONE-PART COMPONENT BODY

BACKGROUND OF THE INVENTION

Field of the Invention

The invention relates to a turbocharger for a combustion engine, in particular for a motor vehicle, wherein the turbocharger has an adjusting device for matching its operating behavior to the operating behavior of the combustion engine, which device is actuated by means of an actuating actuator.

To reduce fuel consumption and pollutant emissions while realizing the same or even increased power of the combustion engine, in particular of an internal combustion engine in a motor vehicle, it is increasingly the case that small-volume engine concepts, so-called downsizing concepts, are taken as a starting point, which are equipped with turbochargers for the purposes of increasing power.

The operating principle of a turbocharger consists in utilizing the energy contained in the exhaust-gas flow to increase the pressure in the intake tract of the combustion engine and in this way to bring about better charging of the combustion chamber with atmospheric oxygen and thus enable more fuel, gasoline or diesel, to be converted in each combustion process, that is to say to increase the power of the combustion engine.

To this end, the turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine impeller arranged therein, which is driven by the exhaust-gas mass flow. The fresh-air compressor has a compressor housing and a compressor impeller arranged therein, which builds up a boost pressure. The turbine impeller and the compressor impeller are arranged rotationally conjointly on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and fresh-air compressor, and is rotatably mounted in said rotor bearing in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine, behind the fresh-air compressor in relation to the fresh-air mass flow, and thereby ensuring better filling of the combustion chamber with atmospheric oxygen.

Turbines and compressors are turbomachines and have, on account of physical laws, an optimal operating range, dependent in each case on the overall size and design, which is characterized by the mass throughput, the pressure ratio and the rotational speed of the respective impeller.

In contrast thereto, the operation of a combustion engine, in particular an internal combustion engine, in a motor vehicle is characterized by dynamic changes in the load and the operating range.

In order now to be able to adapt the operating range of the turbocharger to changing operating ranges of the combustion engine and thus to ensure a desired response behavior as far as possible without noticeable delays (turbo lag), turbochargers are equipped with additional adjusting devices, for example what is known as variable turbine geometry (VTG) or a wastegate device (WG) on the exhaust-gas or turbine side and an overrun air recirculation or blow-off device on the feed-air or compressor side. These serve to minimize the inert behavior and thus the delayed response behavior of the turbocharger and to avoid damaging operating states.

Depending on the speed and exhaust-gas mass flow of the internal combustion engine, the wastegate valve or the variable turbine geometry is set according to the load requirements in such a way that the speed of the turbine and compressor impellers and the pressure ratio, in particular at the exhaust-gas turbine, can be kept within the desired working range of the turbocharger 1.

On the other hand, there is an oversupply of compressor power in operating phases in which the power of the combustion engine is quickly reduced, likewise owing to the inertia of the turbocharger, and this may lead to "compressor surge". This state entails an increased mechanical load on the components of the turbocharger and of the compressor, in particular, and can even lead to the corresponding components being damaged. It is important to avoid this in operation.

In order to avoid such operating states, exhaust gas is on the one hand directed past the turbine of the turbocharger into the exhaust-gas discharge duct via a wastegate device, and fresh gas that has already been compressed is discharged downstream of the compressor or is expanded via a further bypass valve device and recirculated into the intake region upstream of the compressor.

Since the corresponding settings of the abovementioned adjusting devices must in turn be controlled or regulated as a function of the operating point, corresponding actuating actuators are used for the operating-point-dependent setting of the aforementioned adjusting devices. For this purpose use is preferably made of pneumatic or electromechanical actuators which specify linear or rotary mechanical manipulated variables. These must then be transmitted in turn to the adjusting devices. For this purpose use is made in a known manner of transmission elements, which are coupled directly or indirectly on the one hand to the respective actuating actuator and on the other hand to the respective adjusting device, for transmitting a manipulated variable of the actuating actuator to the adjusting device. High demands in respect of functional reliability, simple assembly and compensation of position tolerances of the components to be connected are made on these transmission elements.

Since, on the other hand, turbochargers are now being used in large numbers, they are increasingly subject to the requirements of large-scale production for the greatest simplicity of construction, ease of production and assembly and low overall costs.

SUMMARY OF THE INVENTION

It is therefore the underlying object of the present invention to specify a turbocharger which is distinguished by high operational reliability with, at the same time, a simplified construction and reduced costs.

Said object is achieved by a turbocharger having the features as claimed. Advantageous embodiments and refinements, which may be used individually or, where they do not involve mutually exclusive alternatives, in combination with one another, form the subject matter of the dependent claims.

According to the invention, a turbocharger for a combustion engine is presented which has an adjusting device for matching its operating behavior to the operating behavior of the combustion engine, an actuating actuator, for actuating the adjusting device, and a transmission element, which is coupled directly or indirectly on the one hand to the actuating actuator at a first coupling point and on the other hand to the adjusting device at a second coupling point for transmitting a manipulated variable of the actuating actuator to the adjusting device.

This turbocharger is characterized in that the transmission element has a one-part component body, which in each case extends from the first coupling point 62 to the second coupling point along a longitudinal axis 75 and wherein, in each of its end regions facing the first coupling point or the second coupling point, the component body has a coupling element for coupling to the actuating actuator and to the adjusting device, wherein the respective coupling element is designed as an integral part of the component body (73) in the form of a ball receptacle (82) of a ball joint connection (80) in the component body (73).

In the case of such an embodiment of the turbocharger, cost advantages can be achieved through the use of the transmission element described and the simple construction thereof as well as uncomplicated production and assembly.

An advantageous embodiment of the turbocharger according to the invention is distinguished by the fact that the component body of the transmission element is designed as a one-part shaped sheet metal part produced from a metal sheet or a sheet metal strip by a punching and bending method or a punching and deep-drawing method or a deep-drawing method. This is accomplished, for example, by first of all punching a two-dimensional basic geometry of the component body out of a sheet steel blank and then imparting the final three-dimensional shape to said body in one or more successive bending and/or deep-drawing dies. Dies which combine all the required punching and bending or deep-drawing functions are also possible. Particularly in the case of large series, this embodiment is distinguished by low costs for materials and production.

As a further embodiment of the turbocharger, at least one separate spring element or a spring element formed on the component body is provided in each case in order to secure a respective joint ball in the ball receptacle of the respective ball joint connection of the transmission element. It is possible, for example, after the insertion of the joint ball into the ball receptacle, for a separate spring element to be inserted in such a way under preload into an aperture provided for this purpose in the component body in the region of the ball receptacle that the joint ball is locked or secured against falling out in the ball receptacle. In another example, it is also possible in each case for the spring element or a plurality of spring elements to be formed in one piece with the component body, e.g. in the form of a securing tab which fits around the joint ball beyond the maximum circumference thereof and rests resiliently under preload against the joint ball. Here, the respective securing tab is designed in such a way that, to mount the joint ball in the ball receptacle, the tab can be bent up in the elastic range in such a way that the joint ball can be inserted.

In this way, a secured ball joint connection is provided that requires only a few separate component elements or none at all, this in turn having a positive effect on costs. Moreover, in this way any play in the ball joint connection is eliminated, thereby making it possible to avoid vibration noises in operation and to minimize wear.

A further embodiment of the turbocharger is distinguished by the fact that at least one bead and/or protrusion is formed on the component body of the transmission element in the direction of the longitudinal axis of the component body in order to stabilize the component body. This makes it possible to reduce the sheet metal thickness while maintaining the same stability, e.g. against buckling under shear load. This too contributes in this way to reducing the material costs and additionally to reducing weight.

The features and combinations of features of the embodiments of the subject matter according to the invention, which embodiments are specified above in the description, insofar as they are not usable alternatively or are not mutually exclusive, can individually, partially or entirely also be used in mutual combination or so as to supplement one another in the development of the subject matter according to the invention without departing from the scope of the invention.

Corresponding and further embodiments of turbochargers 29 according to the invention are explained in greater detail 30 with the aid of the figures.

BRIEF DESCRIPTION OF THE SEVERAL VIEWS OF THE DRAWING

FIG. 4 shows a further three-dimensional illustration of a further transmission element of an embodiment of the turbocharger in two views, as well as a partial section thereof;

DETAILED DESCRIPTION OF THE INVENTION

Parts which are identical in terms of function and designation are denoted by the same reference signs throughout the figures. When, in the course of describing the objects shown in the figures, the terms "top", "above" or "upper side" and "bottom", "below" or "lower side" are used, "top", "above" and "upper side" refer to the region facing away from the joint ball 81 in the case of the transmission element 70 and the component body 73, respectively, and to the region facing the ball seat in the case of the joint ball 81. "Bottom", "below" and "lower side" are used to denote the correspondingly opposite regions.

Figure 1:
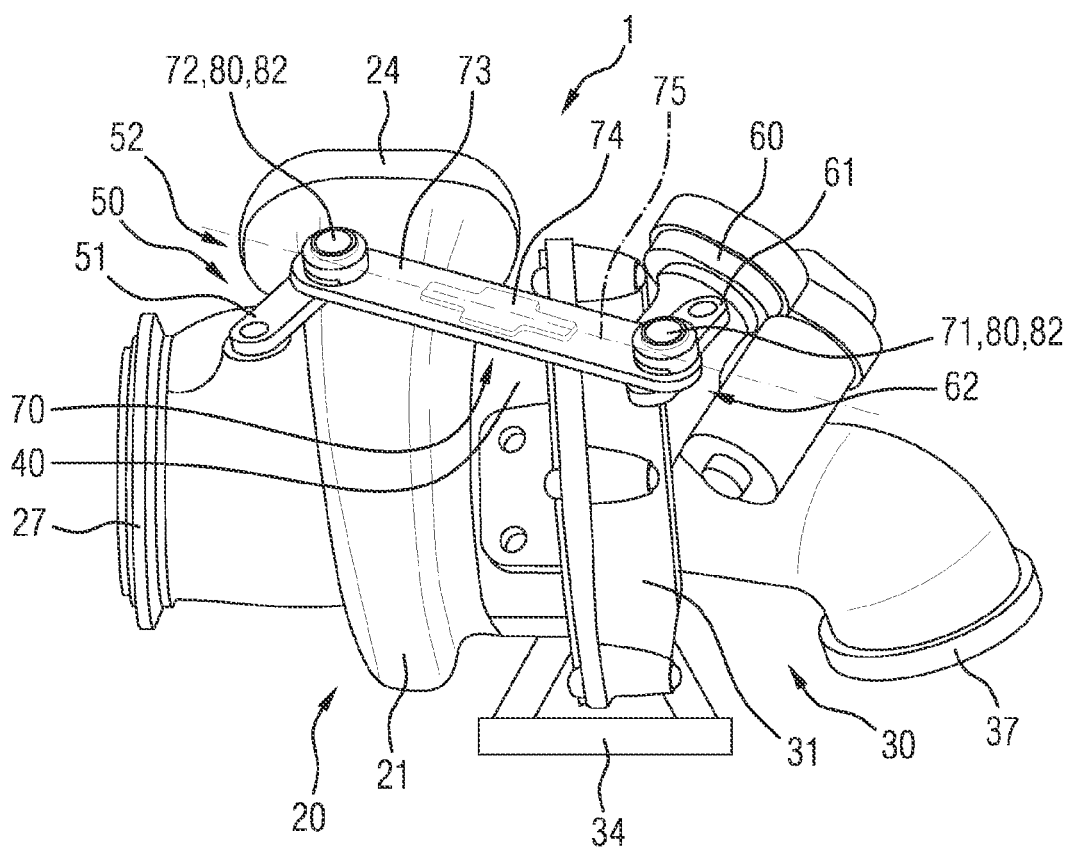
FIG. 1 shows an illustration of a turbocharger according to the invention having an adjusting device, an actuating actuator and a transmission element.

FIG. 1 shows the basic construction of an embodiment of the turbocharger 1 according to the invention, with an exhaust-gas turbine 20, a fresh-air compressor designed as a radial compressor 30 and a rotor bearing unit 40 arranged therebetween.

The turbine housing 21 has a manifold connector 24 for connection to the exhaust manifold of a combustion engine, and an exhaust connector 27 for connection to the exhaust pipe. Also visible on the exhaust-gas turbine 20 is an adjusting lever 51, with a second coupling point 52, an adjusting device 50 arranged inside the housing, here for example a wastegate valve.

FIG. 1 furthermore shows the fresh-air compressor, which is embodied as a radial compressor 30. The compressor housing 31 has an intake manifold connector 34 for connection to the intake manifold of the combustion engine and an intake connector connection 37 for connection to the intake connector of the combustion engine, via which fresh air is drawn in from outside, for example via a filter unit.

Arranged on the compressor housing 31 is an actuating actuator 60, for actuating the adjusting device 50, said actuator being designed in this embodiment as an electromechanical actuating drive with an output crank 61, having a first coupling point 62. A transmission element 70 is provided for transmitting the manipulated variable specified by the actuating actuator 60 to the adjusting device 50, said transmission element being coupled here via the first coupling point 62 of the output crank 61 to the actuating actuator 60 on the one hand and via the second coupling point 52 of the adjusting lever 51 to the adjusting device 50 on the other hand.

The transmission element 70 has a one-part component body 73, which in each case extends from the first coupling point 62 to the second coupling point 52 along a longitudinal axis 75 and wherein, in each of its end regions facing the first coupling point 62 or the second coupling point 52, the component body 73 has a coupling element 71, 72 for coupling to the actuating actuator 60 and to the adjusting device 50, wherein the respective coupling element 71, 72 is designed as an integral part of the component body 73 in the form of a ball receptacle 82 of a ball joint connection 80 in the component body 73. As can already be seen from FIG. 1, in the embodiment of the turbocharger 1 shown, the transmission element 70 has a component body 73, at the opposite ends of which there is arranged in each case a coupling element 71, 72 designed as a ball receptacle 82 of a ball joint connection 80. Furthermore, the component body 73 illustrated has a protrusion 74 extending along the longitudinal axis 75, between the coupling points 52, 62, in the central region of the component body and providing the component body 73 with increased stability against buckling under shear load.

Figure 2:
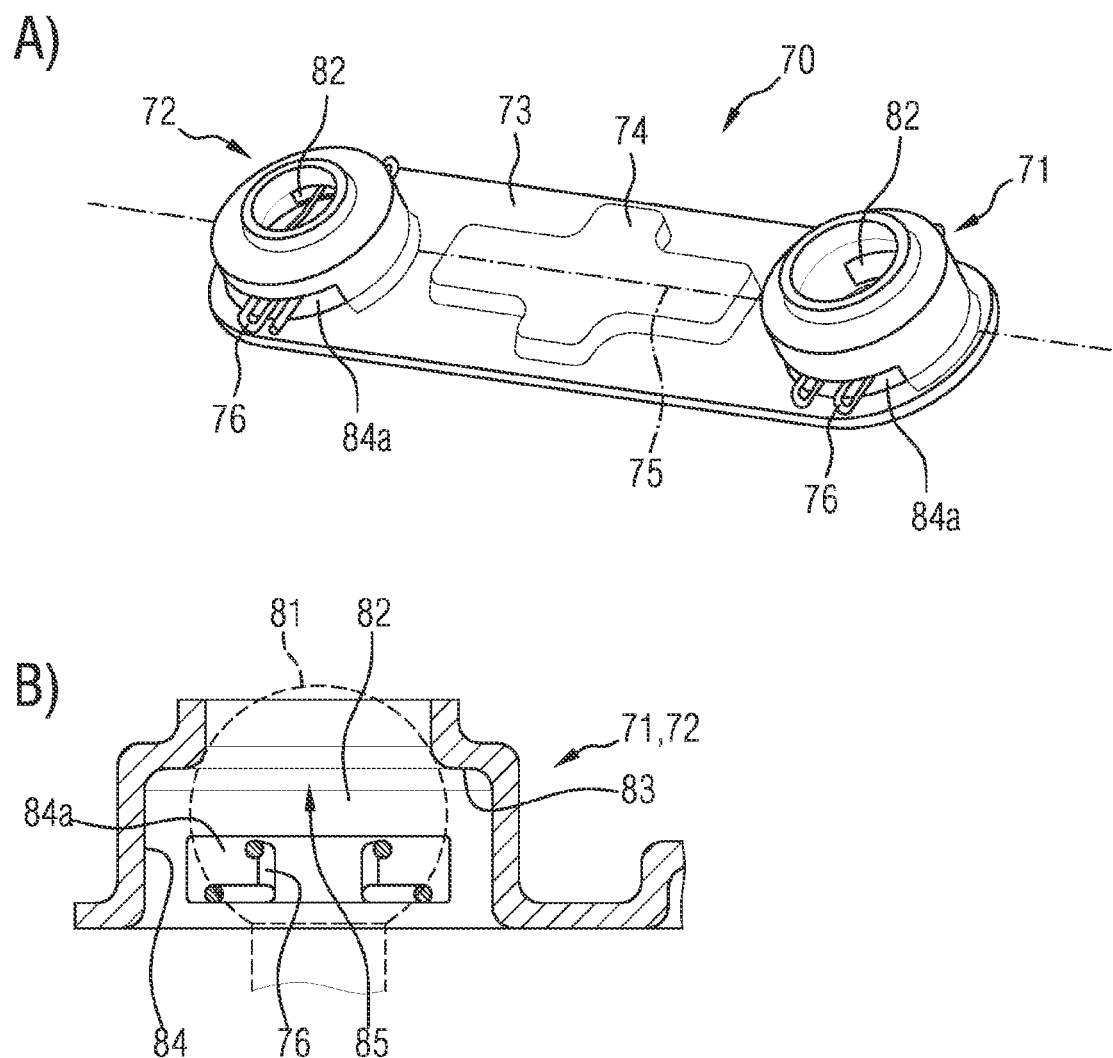
FIG. 2 shows a three-dimensional illustration of a transmission element of an embodiment of the turbocharger as well as a partial section thereof.

In FIG. 2, in view A), the transmission element 70 already illustrated in FIG. 1 is then illustrated in isolation and on an enlarged scale, making the details easier to see. The transmission element 70 has a component body 73 that is produced, for example, by a punching and deep-drawing method. Provided at each of the two opposite ends of the component body is a coupling element 71, 72, which is designed as a ball receptacle 82 of a ball joint connection 80.

The ball joint connection 80 consists of the joint ball 81 and the complementarily designed ball receptacle 82 or ball seat, which is formed here by a circular shoulder or opening 85 in the pot bottom 83.

As will be seen from the partial sectional view of the ball receptacle 82 in view B) of FIG. 2, the respective ball receptacle 82 is designed as a cylindrical, pot-shaped depression with a pot bottom 83, a pot wall 84 and a circular shoulder or opening 85 in the pot bottom 83, as a seat for the joint ball 81 (indicated with a dashed line in this view). In this case, the pot wall 84 has at least one pot wall aperture 84a for receiving a separate spring element 76 for securing the joint ball 81. It can be seen that the spring element 76 is here designed, for example, as a bent spring wire clip which, after insertion into the pot wall aperture 84a, fits around the joint ball 81 below the largest circumference of the joint ball 81 and rests against the latter under spring preload. In this way, the joint ball 81 is held without play against the ball seat in the pot bottom 83 by means of the spring element. The spring element 76, which rests against the joint ball 81 under spring force, generates a counterforce to the rotational or pivoting movements of the joint ball 81 in its ball seat through friction and thus advantageously additionally acts as a vibration-damping component.

Figure 3:
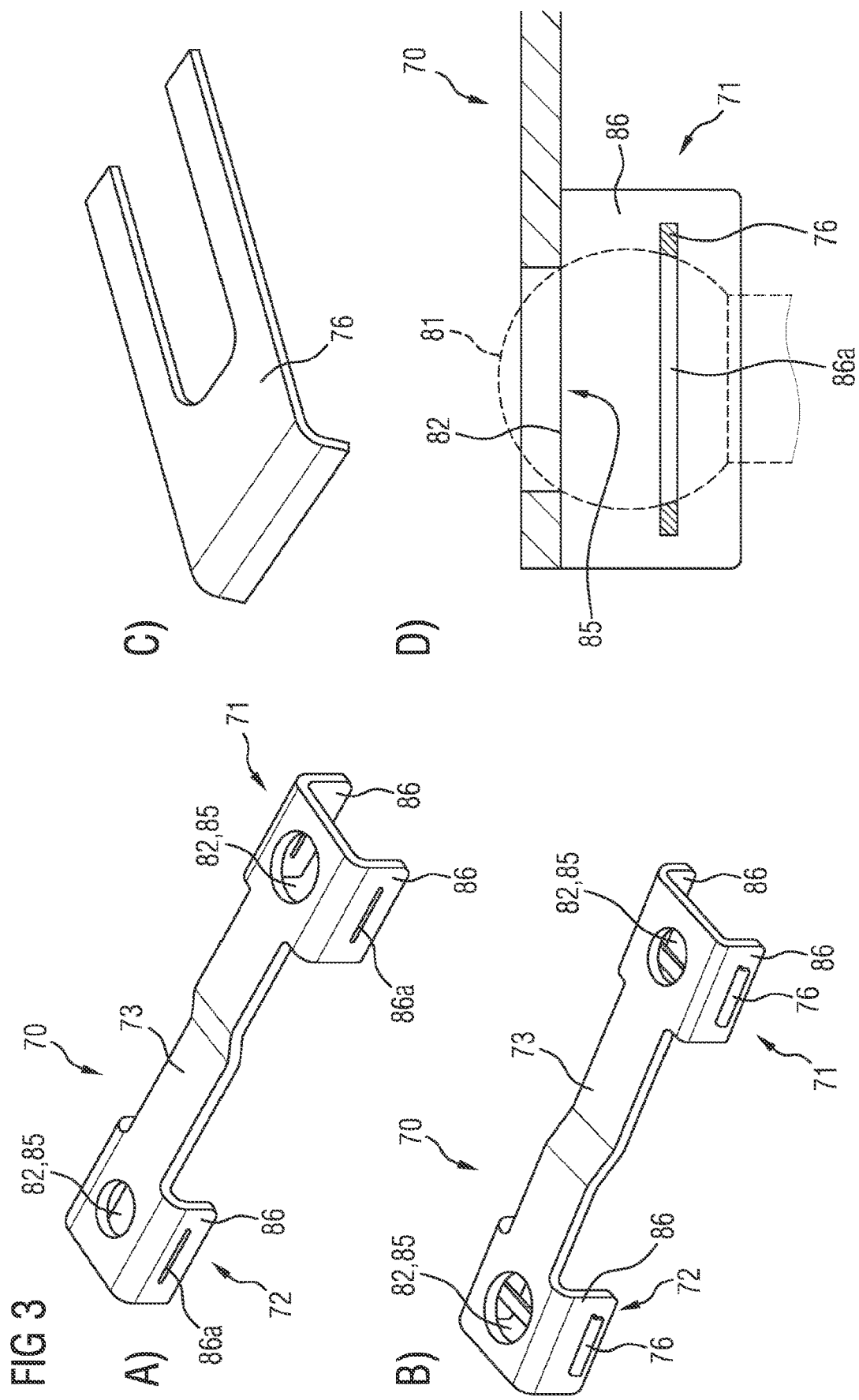
FIG. 3 shows a three-dimensional illustration of a further transmission element of an embodiment of the turbocharger in two views as well as a partial section thereof, and a spring element for securing the ball joint connection.

FIG. 3 illustrates a transmission element 70 of a further embodiment of the turbocharger 1 according to the invention, which is an alternative to the embodiment in FIG. 2. The embodiment of the transmission element 70 shown in FIG. 3 is produced, for example, by a punching and bending method and is characterized in that the ball receptacle 82 of the respective coupling element 71, 72 is designed in each case as a circular opening 85 at the respective end of the component body (73), which forms the ball receptacle 82 or ball seat for the joint ball 81. On both sides of the ball receptacle 82, a respective securing tab 86 bent over in the direction of the joint ball 81 is formed on the component body 73, wherein the respective securing tab 86 has at least one securing tab aperture 86a for receiving a separate spring element 76 for securing the joint ball 81.

In view A) of FIG. 3, the transmission element 70 is illustrated without the spring elements 76 inserted, and the securing tab apertures 86a can be seen.

View B of FIG. 3 shows the same transmission element 70 with inserted spring elements 76.

View C) of FIG. 3 shows a corresponding spring element in enlarged view. Here, the spring element is embodied as a leaf spring element in fork form.

Finally, view D) of FIG. 3 shows a partial section of a coupling element 71, 72 of this embodiment, analogous to view B) of FIG. 2, from which the arrangement of the joint ball 81 (indicated here by dashed lines) and the securing of the ball 81 in the ball receptacle 82 or ball seat can be seen. Here too, the securing tab aperture is arranged in the securing tabs 86 in such a way that, when installed, the fork-shaped separate spring element 76 fits around the joint ball 81 below the largest circumference of the joint ball 81 and rests against it under spring preload. In this way, the joint ball 81 is once again held without play against the ball seat in the component body 73 by means of the spring element 76. The spring element 76, which rests against the joint ball 81 under spring force, generates a counterforce to the rotational or pivoting movements of the joint ball 81 in its ball seat through friction and thus advantageously additionally acts as a vibration-damping component.

FIG. 4 shows a further transmission element 70 of a further embodiment of the turbocharger 1 according to the invention, which is an alternative to the embodiments shown previously in FIGS. 2 and 3. The transmission element 70 has a component body 73 that is produced, for example, by a punching and bending method. Provided at each of the two opposite ends of the component body is a coupling element 71, 72, which is designed as a ball receptacle 82 of a ball joint connection 80. This embodiment is characterized in particular by the fact that the respective ball receptacle 82 is formed by two ball seat tabs 87, which are cut out of the component body 73, lie opposite one another and are bent up out of the plane of the component body 73 in the opposite direction to the joint ball 81 and serve as a ball receptacle 82 or ball seat for the joint ball 81. On both sides of the ball receptacle 82, a respective securing tab 86, bent over in the direction of the joint ball 81, is formed on the component body 73, wherein the respective securing tab 86 is bent over in the direction of the joint ball to such an extent that it rests resiliently against the joint ball 81 and thus acts as an integrated spring element 77 for securing the respective joint ball 81 in the ball receptacle 82.

To assemble the respective ball joint connection 80, the two securing tabs 86 are bent open to such an extent in the elastic range that the joint ball can be inserted into the ball seat. After insertion of the joint ball 81, the securing tabs 86 rest under preload against the joint ball in a region below the largest ball circumference and in this way hold it in the ball seat. In this embodiment too, the securing tabs 86 resting against the joint ball 81 under spring force generate a counterforce to the rotational or pivoting movements of the joint ball 81 in its ball seat through friction and thus advantageously additionally act as vibration-damping components.

In view A) of FIG. 4, the transmission element 70 is shown from the upper side, with the result that the ball seat tabs 87 cut out of the component body 73, lying opposite one another and bent up out of the plane of the component body 73 in the opposite direction to the joint ball 81, are clearly visible.

View B) of FIG. 4 shows the same transmission element 70 from the lower side thereof, and therefore the securing tabs 86 on the component body, which are each bent over in the direction of the joint ball 81 on both sides of the ball seat, are readily visible.

Finally, view C) of FIG. 4 shows a partial section of a coupling element 71, 72 of this embodiment, analogous to view B) of FIG. 2 and view D) of FIG. 3, from which once again the arrangement of the joint ball 81 (indicated here by dashed lines) and the securing of the joint ball 81 in the ball receptacle 82 or ball seat by means of the securing tabs 86 can be seen. Here, the securing tabs are bent over in the direction of the joint ball 81 to such an extent that they rest resiliently, below the maximum diameter of the joint ball 81, against the joint ball 81, and thus act as an integrated spring element 77 for securing the respective joint ball 81 in the ball receptacle 82.

Figure 5:
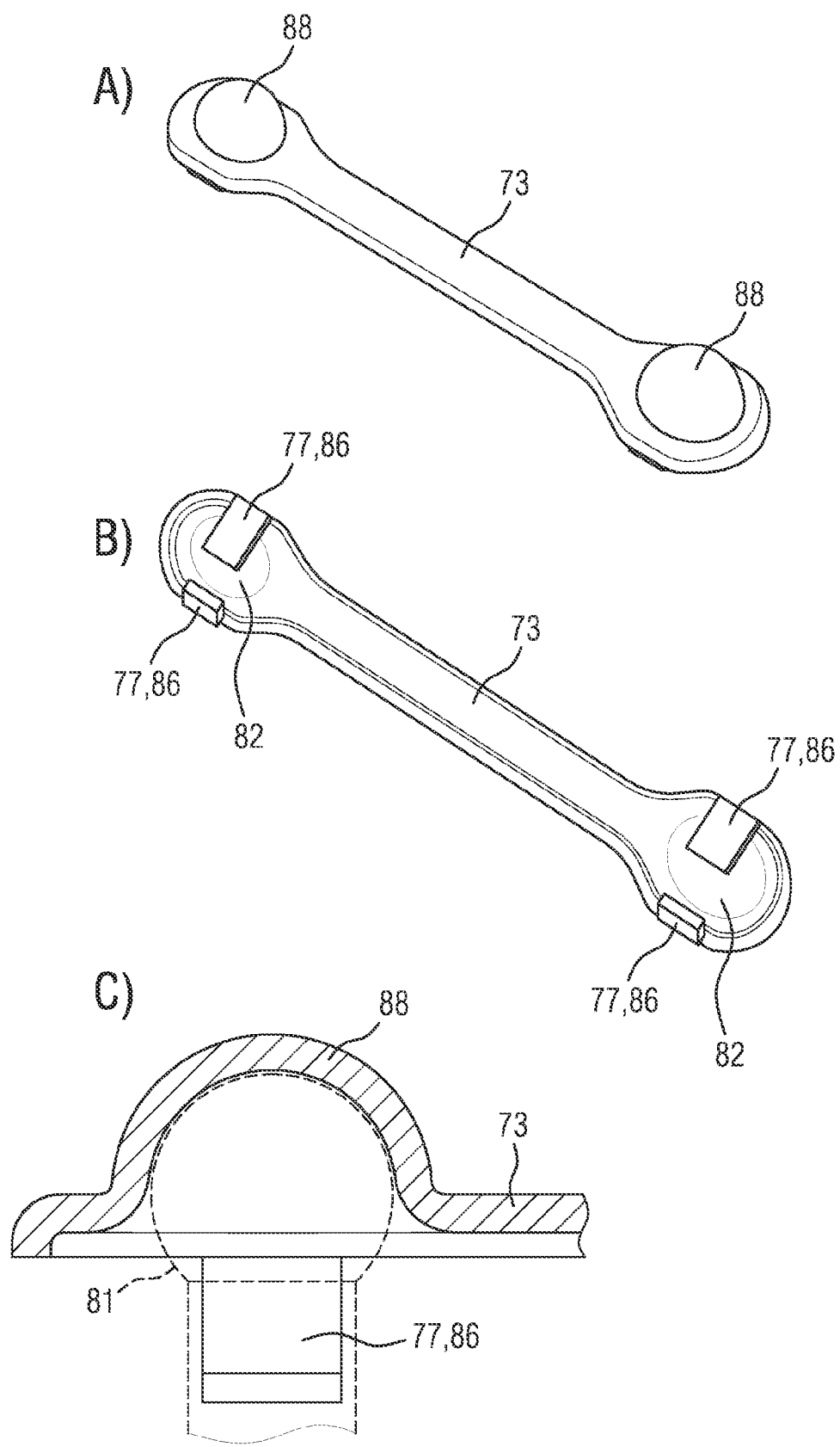
FIG. 5 shows a further three-dimensional illustration of a further transmission element of an embodiment of the turbocharger in two views, as well as a partial section thereof.

Finally, FIG. 5 shows a further transmission element 70 of a further embodiment of the turbocharger 1 according to the invention, which is an alternative to the embodiments shown previously in FIGS. 2, 3 and 4. The transmission element 70 shown here likewise has a component body 73 that is produced, for example, by a punching and deep-drawing method. Provided at each of the two opposite ends of the component body 73 is a coupling element 71, 72, which is designed as a ball receptacle 82 of a ball joint connection 80.

This embodiment is characterized, in particular, in that the ball receptacle 82 is formed by a spherical cap 88 formed upwardly, i.e. in the opposite direction to the joint ball 81, in the component body, for example by a deep-drawing method, as a ball receptacle 82 or ball seat for the joint ball 81. Here too, on both sides of the ball receptacle 82, securing tabs 86 bent over in the direction of the joint ball 81 are formed on the component body 73, wherein the respective securing tab 86 is bent over in the direction of the joint ball 81 to such an extent that it rests resiliently against the joint ball 81 and thus acts as an integrated spring element 77 for securing the respective joint ball 81 in the ball receptacle 82.

Here too, to assemble the respective ball joint connection 80, the two securing tabs 86 must be bent open to such an extent in the elastic range that the joint ball can be inserted into the ball seat. After insertion of the joint ball 81, the securing tabs 86 rest under preload against the joint ball in a region below the largest ball circumference and in this way hold it in the ball seat. In this embodiment too, the securing tabs 86 resting against the joint ball 81 under spring force generate a counterforce to the rotational or pivoting movements of the joint ball 81 in its ball seat through friction and thus advantageously additionally act as vibration-damping components.

In view A) of FIG. 5, the transmission element 70 is shown from the upper side, with the result that the spherical caps 88 formed in the component body 73 and formed out of the plane of the component body 73 in the opposite direction to the joint ball 81, i.e. upwardly, are clearly visible.

View B) of FIG. 5 shows the same transmission element 70 from the lower side thereof, with the result that the ball receptacle 82 or the respective ball seat as well as the securing tabs 86, which are each bent over in the direction of the joint ball 81, are formed on the component body 73 and act as integrated spring elements 77 for securing the joint ball 81 in the ball seat, are clearly visible.

Finally, view C) of FIG. 4 shows a partial section of a coupling element 71, 72 of this embodiment, analogous to views B), D) and C) of FIGS. 2, 3 and 4, from which once again the arrangement of the joint ball 81 (indicated here by dashed lines) and the securing of the joint ball 81 in the ball receptacle 82 or ball seat by means of the securing tabs 86 can be seen. Here, the securing tabs are bent over in the direction of the joint ball 81 to such an extent that they rest resiliently, below the maximum diameter of the joint ball 81, against the joint ball 81, and thus act as an integrated spring element 77 for securing the respective joint ball 81 in the ball receptacle 82.

The invention claimed is:

1. A turbocharger for a combustion engine, the turbocharger comprising:
   an adjusting device for matching an operating behavior of the turbocharger to an operating behavior of the combustion engine;
   an actuating actuator for actuating said adjusting device;
   a transmission element for transmitting a manipulated variable of said actuating actuator to said adjusting device;
   said transmission element being coupled directly or indirectly to said actuating actuator at a first coupling point and to said adjusting device at a second coupling point;
   said transmission element having a one-part component body that extends from said first coupling point to said second coupling point along a longitudinal axis and said component body having a respective coupling element at each of an end region facing said first coupling point for coupling to said actuating actuator and at an end region facing said second coupling point for coupling to said adjusting device;
   wherein each of said coupling elements is an integral part of said component body, and forms a ball receptacle of a ball joint connection in said component body;
   wherein each of said coupling elements is provided with one separate spring element; and
   wherein said one separate spring element is received in an aperture of the respective ball receptacle and is configured to apply a preloaded spring force to a respective joint ball, in order to hold the respective joint ball in the respective ball receptacle without play and secure the respective joint ball in the respective ball receptacle of the respective ball joint connection of said transmission element.

2. The turbocharger according to claim 1, wherein said component body is a one-part shaped sheet metal part produced from a metal sheet or a sheet metal strip by a process selected from the group consisting of a punching and bending method, a punching and deep-drawing method, and a deep-drawing method.

3. The turbocharger according to claim 1, wherein said component body of said transmission element is formed with at least one bead and/or protrusion in a direction of the longitudinal axis of said component body in order to stabilize said component body.

4. The turbocharger according to claim 1, wherein each said ball receptacle is a cylindrical, pot-shaped depression with a pot bottom, a pot wall and a circular shoulder or opening in said pot bottom, forming a ball seat for the respective joint ball, and said pot wall is formed with the aperture receiving said one separate spring element to hold the joint ball in the respective said ball receptacle.

5. The turbocharger according to claim 1, wherein each said ball receptacle of the respective said coupling element is a circular opening in said component body, forming a ball seat for the joint ball, each having a securing tab on said component body, bent over in a direction of the joint ball, on both sides of said ball seat, and wherein the respective said securing tab is formed with at least one securing tab aperture for receiving said one separate spring element for securing the joint ball in the respective said ball receptacle.

* * * * *